United States Patent [19]

Iimura et al.

[11] Patent Number: 5,278,836
[45] Date of Patent: Jan. 11, 1994

[54] MULTICHANNEL COMMUNICATION PROCESSING SYSTEM

[75] Inventors: Kenji Iimura, Hitachi; Sakae Miki, Tokyo; Kenji Kawakita, Yokohama, all of Japan

[73] Assignee: Hitachi, Ltd., Tokyo, Japan

[21] Appl. No.: 669,974

[22] Filed: Mar. 15, 1991

[30] Foreign Application Priority Data

Mar. 15, 1990 [JP]   Japan .................................. 2-64940

[51] Int. Cl.⁵ .............................................. H04J 3/04
[52] U.S. Cl. .................................. 370/112; 370/85.13
[58] Field of Search ................... 370/112, 110.1, 85.1, 370/67, 58.1, 58.2, 58.3, 77; 340/825.5, 825.06; 379/88, 196

[56] References Cited

U.S. PATENT DOCUMENTS

| | | | |
|---|---|---|---|
| 3,990,050 | 11/1976 | Kolettis et al. | 340/172.5 |
| 4,625,307 | 11/1986 | Tulpule et al. | 370/85.13 |
| 5,014,269 | 5/1991 | Picandet | 370/110.1 |
| 5,027,349 | 6/1991 | Thorne | 370/110.1 |

FOREIGN PATENT DOCUMENTS

| | | |
|---|---|---|
| 0259117 | 2/1991 | European Pat. Off. . |
| 0447054 | 6/1992 | European Pat. Off. . |
| 58-166852 | 12/1983 | Japan . |
| 1-302941 | 12/1989 | Japan . |

OTHER PUBLICATIONS

Supplement to British Telecommunications Engineering, Part 2, vol. 7, Jul. 1988, London GB, "Integrated Services Digital Network" by D. Lee.
Studiedag Digitale Telekommunikatie, Nov. 18, 1986, Gent BE, by R. Theews, "Evolutie Naarisdn in Private Schakelsystemen".
IEEE National Conference on Telecommunication, "Integrated Circuits for ISDN-Status and Future" by G. Geiger, et al., Apr. 2, 1989, York GB.

Primary Examiner—Douglas W. Olms
Assistant Examiner—Shick Hom
Attorney, Agent, or Firm—Antonelli, Terry, Stout & Kraus

[57] ABSTRACT

A multichannel communication processing system having line control apparatus means for analyzing receiving frames and channel-controlling transmitting frames, DMA control apparatus for transferring the data not via a host processor but directly to a main memory, a memory for storing a variety of data and a communication protocol processing program, a CPU for controlling the communication processing system as a whole and line correspondence apparatus including line correspondence units provided between the lines and the line control apparatus whereby serial interfaces with channels of the plurality of lines are effected.

46 Claims, 7 Drawing Sheets

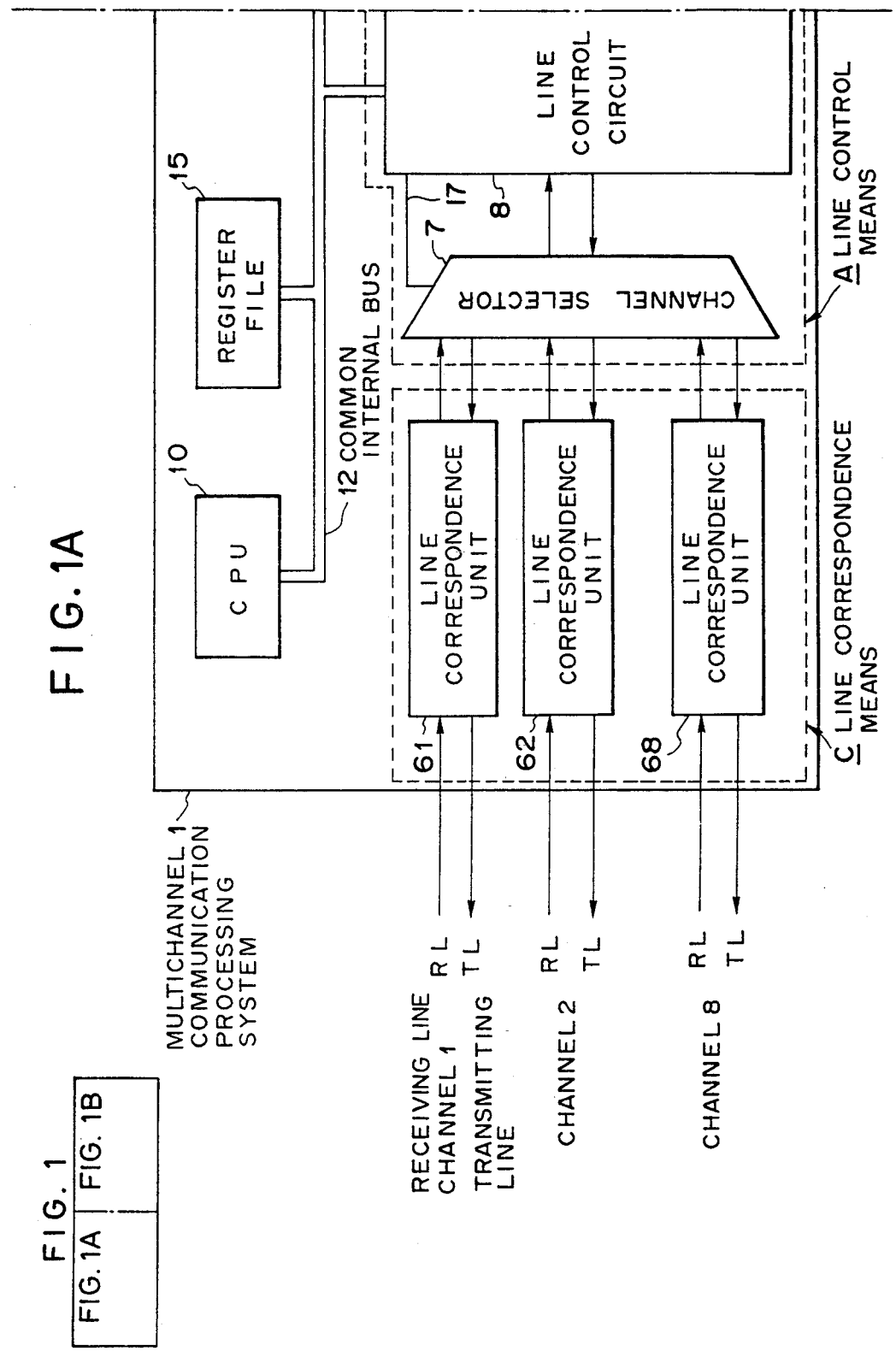

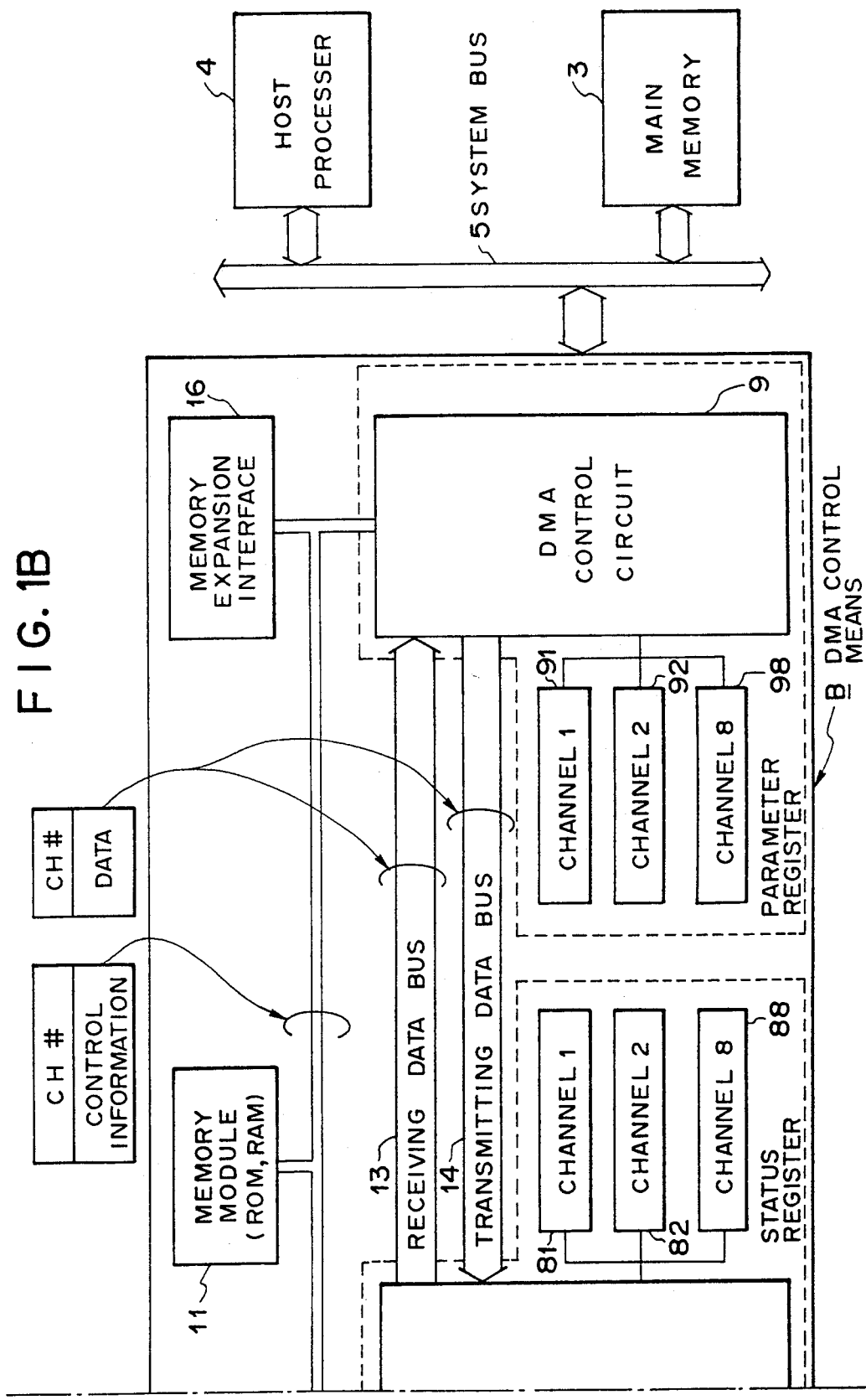

MULTICHANNEL COMMUNICATION PROCESSING SYSTEM

BACKGROUND OF THE INVENTION

1. Field of the Invention

The present invention is directed generally to a multichannel communication processing system, and more particularly, to frame processing means for processing a plurality of frames by use of a set of a CPU, a DMA control module and so on.

2. Description of Background

A conventional system for processing a communication protocol is disclosed in, e.g., Japanese Patent Laid-Open No. 144839/1989. FIG. 2 illustrates a construction of this conventional system.

A communication processing system 2 comprises a line control module 21, a transmitting/receiving FIFO (first-in first-out) memory 22, a DMA control module 23, a memory 24, a CPU 25 and an internal bus 26. The line control module 21 effects a serial interface with a remote station through transmitting/receiving lines. The memory 22 temporarily stores the transmitting-/receiving data. The DMA control module 23 transfers the data directly to a main memory 3 on the side of a host processor 4. The memory 24 stores a communication processing program and the data. The CPU 25 controls the communication processing system 2 as a whole. The bus 26 connects circuits thereof.

The communication processing system 2 is formed on a single semiconductor substrate such as a silicon substrate by a known semiconductor integrated circuit processing technology to provide LSI.

The communication processing system LSI 2 is employed for processing a link access procedure-on D channel LAPD serving as a communication protocol of, e.g., an integrated services digital network ISDN. In this case, a transmitting/receiving line rate is 16 or 64 kbps, while an operating system clock of the internal CPU 25 is, for instance, 6 MHz.

The conventional technology described above is limited to a case where only one transmitting/receiving line is prepared. No consideration is given to an application to a system having a plurality of lines. Hence, when constructing the system which, as in a station exchange or a private branch exchange, accommodates a plurality, particularly, a multiplicity of lines, it is required that the communication processing systems LSI2 be used one by one for every line. This results in a scale-up of the whole system and an increase in costs as well.

The transmitting/receiving line rate of 16 kbps or 64 kbps amounts to approximately 1/380 and 1/100, of the system clock of 6 MHz. Thus the transmitting/receiving line rate of 16 kbps or 64 kbps is very low speed as compared with the operating system clock of 6 MHz of the built-in CPU 25. Hence, the time for waiting for an interruption from the line control module 21 or the DMA control module 23 is much longer than in a state where the built-in CPU 25 works to control the single transmitting/receiving line. The communication processing system LSI2 is therefore inefficient.

SUMMARY OF THE INVENTION

Accordingly, it is an object of this invention to provide a multichannel communication processing system capable of efficiently controlling communication protocol processing of a plurality of lines and miniaturizing the system as a whole.

To accomplish the foregoing object, according to one aspect of the present invention, in a communication processing system for controlling a data transfer to a plurality of lines in accordance with a communication protocol by using a set of a line control means for analyzing receiving frames and channel-controlling of transmitting frames, a DMA control means for transferring the data not via a host processor but directly to a main memory, a memory for storing a variety of data and a communication protocol processing program and a CPU for controlling the communication processing system as a whole, there is provided the improvement characterized in that a line correspondence means including line correspondence units for effecting interfaces with channels of the plurality of lines is disposed between the lines and the line control means.

To accomplish the foregoing object, according to another aspect of the invention, there is provided a multichannel communication processing system characterized by providing: a line correspondence means including line correspondence units for effecting interfaces with channels of the plurality of lines between the lines and the line control means; a multiplex control circuit for separating the multiplexed data transmitted from multiplex transmitting/receiving lines, supplying the data to the line correspondence units, multiplexing en bloc the data given from the line correspondence units and sending the data to the multiplex transmitting-/receiving lines between the line correspondence means and the multiplex transmitting/receiving lines.

Each of the line correspondence units includes a data buffer for temporarily storing the data, the line control means includes a channel selector for selecting each of the line correspondence units and a register for holding statuses per channel, and the DMA control means includes a register for holding parameters per channel.

The data transferred between the CPU, the line control means, the DMA control means and the memory contain channel information.

It is desirable to increase a data transfer rate that data buses dedicated to receiving and transmitting are disposed between the line control means and the DMA control means.

The multichannel communication processing system can be constructed of one or a plurality of semiconductor chips.

Any multichannel communication processing systems are applicable to an ISDN communication protocol LSI and an exchange.

According to this invention, when receiving the data from the lines, the low-speed data are temporarily stored in the respective line correspondence units. The data are then transferred via the line control module to the CPU. The CPU is capable of processing at a high speed with the aid of the line control module and the DMA control module. The CPU therefore can execute the receiving process of a plurality of low-speed data lines.

In the case of transmitting, the CPU transmits the transmitting data distributively to the line correspondence units at the high speed with the aid of the DMA control module and the line control module. The line correspondence units in turn transmit the data to the external lines at a low speed.

In this manner, the communication process can be executed at a high efficiency on the occasion of transmitting/receiving of the plurality of lines. The whole system can be miniaturized.

BRIEF DESCRIPTION OF THE DRAWINGS

FIGS. 1(A)-(B) is a block diagram illustrating a configuration of one embodiment of a multichannel communication processing system of this invention;

DESCRIPTION OF THE PREFERRED EMBODIMENTS

Figure 2:
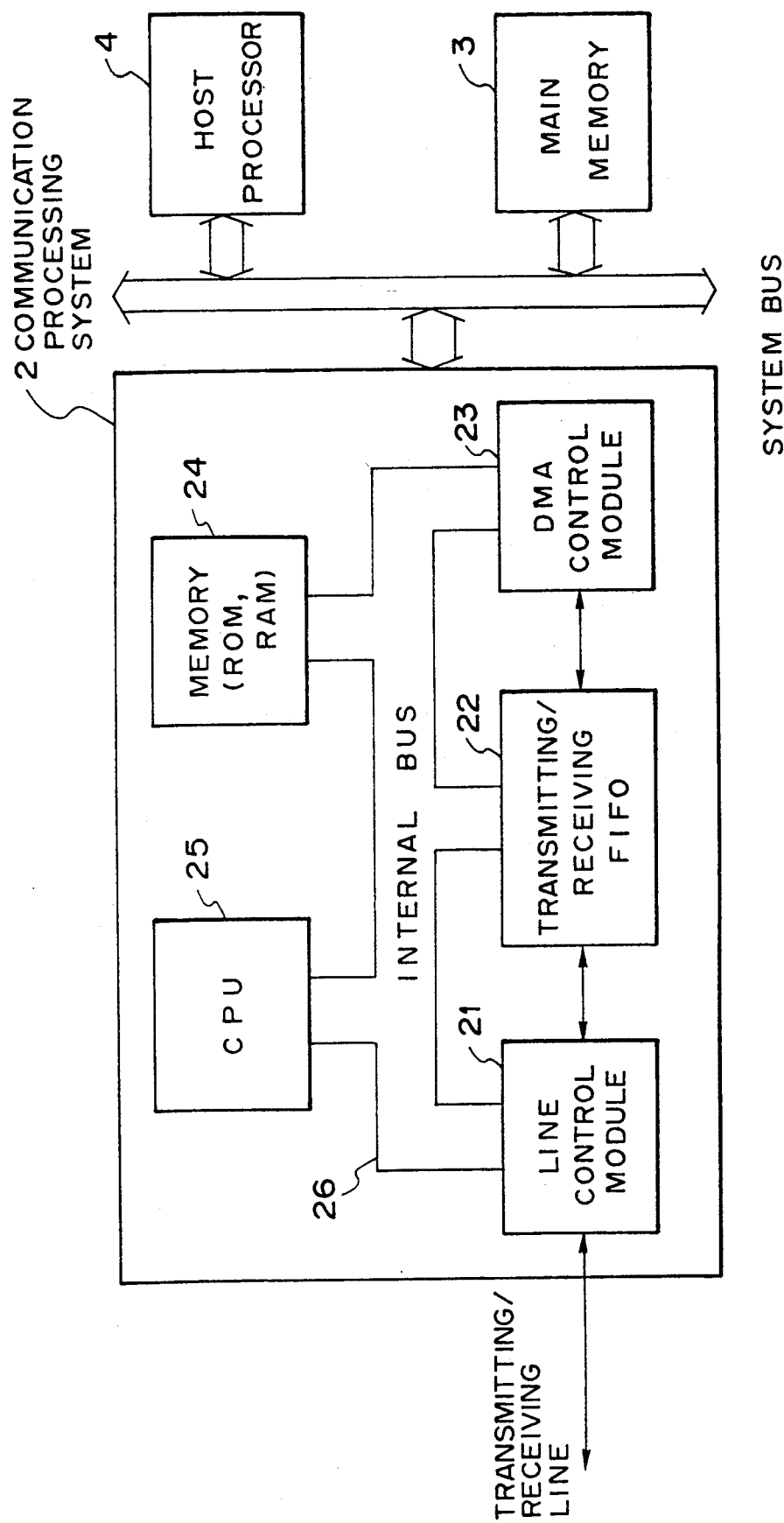
FIG. 2 is a block diagram illustrating one example of configuration of a conventional single-channel communication processing system.

One embodiment of the present invention will hereinafter be described with reference to the accompanying drawings.

FIG. 1 is a block diagram illustrating a configuration of one embodiment of a multichannel communication processing system including a transform-into-multichannel means. A multichannel communication processing system 1 is constructed on one semiconductor substrate such as a silicon substrate by a known semiconductor integrated circuit technology.

The communication processing system LSI1 is connected to a system bus 5 together with a main memory 3 for storing transmitting/receiving data and a variety of parameters for communication protocol processing. A predetermined communication function module is thus configured. The communication processing system LSI1 supports data transfer control procedures and other control when effecting data communications with other communication function modules in which a host processor 4 serves as a remote station.

The communication processing system LSI1 comprises a plurality of line correspondence units 61-68, a channel selector 7, a line control circuit 8, status registers 81-88 provided per line and concomitant therewith, a DMA control circuit 9, parameter registers 91-98 provided per channel and concomitant therewith, a CPU 10, a memory module 11 and a common internal bus 12. The line correspondence units 61-68 perform serial interfaces with the remote station via a receiving line RL and a transmitting line TL. The channel selector 7, which is positioned between the plurality of line correspondence units and the one line control circuit 8, selects one of the lines connecting one of the line correspondence units in response to a control signal on control line 17 from the line control circuit 8.

During receiving of the frames, signals indicative of the receipt of the frame are given from the line correspondence units 61 to 68 to the line control circuit 8. These signals, however, are not illustrated in the drawings. Upon receipt of this information, the line control circuit 8 delivers a control signal to the channel selector via the control line 17 so as to select one of the line correspondence units, thereby enabling the channel selector 7 to select the required line (channel).

Referring now to transmission, the transmission start instruction given by the host processor includes information for appointing or designating the channel. The CPU 10 decodes the channel appointing information and sends the decoded information to the line control circuit 8. Upon receipt of the channel appointing information, the line control circuit 8 delivers a control signal to the channel selector 7 via the control line 17, thereby enabling the channel selector 7 to select the required line (channel). The line control circuit 8 analyzes a receiving frame via any selected one of the line correspondence units 61-68. This circuit 8 also effects channel control of a transmitting frame. The DMA control circuit 9 transfers the data not via the host processor 4 but directly to the main memory 3. The CPU 10 controls the communication processing system LSI1 as a whole. The memory module 11 is constructed of: a RAM for rewritably storing various control data such as system constants needed for controlling the data transfer and also various control information necessary for controlling the data transfer under DMA control; and a ROM into which a communication protocol processing program for prescribing the communication processing procedures and other programs for controlling the entire communication processing system 1 are incorporated. The common internal bus 12 serves to connect circuits thereof. Note that the number 8 of the line correspondence units 61-68 is a mere example, but other numbers are available.

The channel selector 7, the line control circuit 8 and the status registers 81-88 provided per channel are combined to constitute a line control means A. The DMA control circuit 9 and the parameter registers 91-98 provided per channel are combined to form a DMA control means B. The line correspondence units 61-68 form a line correspondence means C. The line correspondence means C is composed of, e.g., an FIFO type data buffer. A storage capacity of the data buffer is desirably set enough to effect buffering even when simultaneously receiving all the channels without a back-up memory. The data buffer storage capacity will be explained later in detail with reference to FIG. 6.

Separately from the common internal bus 12, a receiving data bus 13 and a transmitting data bus 14 which are dedicated to transmission and receipt can be provided between the DMA control circuit 9 and the line control circuit 8. The installation of the receiving/transmitting data buses 13 and 14 dedicated to the transmission and receipt makes it possible to evade conflicts with transfers of other data. A data transfer velocity is thereby improved.

Connectable to the common internal bus 12 separately from the memory module 11 are a register file 15 in which only the register is made independent and a memory interface 16 used for an expansion of the memory module 11.

Next, receiving/transmitting operations in this embodiment will be explained.

For instance, the control procedures of a high level data link control HDLC system are adopted. Received via the receiving line of each channel is a frame in which an address, a control field, an information field and a frame check sequence are interposed between flag sequences. In the line correspondence units 61-68 of the line correspondence means C, when receiving the frames, the frames are accumulated in the FIFO type data buffer. The line control circuit 8 of the line control means A is informed of the fact that the frames are received.

The line control circuit 8 receives a signal informing the receipt of frames coming in from the plurality of line correspondence units 61-68. The CPU 10 is informed of this by, e.g., an interruption from the line control circuit 8. CPU 10 accesses the register file 15, memory module 11, memory expansion interface 16, line control circuit 8, DMA control circuit 9, etc. via common internal bus 12.

The CPU 10 receives interruption from the line control circuit 8 and reads the control information on channel numbers, channel present statuses, addresses and control fields from the line control circuit 8 via common internal bus 12. The CPU 10 checks a variety of parameters stored in the memory module 11 via common internal bus 12. In the case of the frame to be received correctly, a receiving process start command is issued to the DMA control circuit 9 of the DMA control means B as well as to the line control circuit 8 via common internal bus 12. Furthermore, the CPU 10 sets, in the per-channel parameter registers 91-98 of the DMA control circuit 9, parameters such as the number of bytes and addresses of the data buffer on the main memory 3 defined as a transfer destination of the information field.

The line control circuit 8 controls the channel selector 7 on the basis of the channel numbers. The information fields of the frames accumulated in the line control circuit 8 are transferred while being marked with the channel numbers via the receiving data bus 13 to the DMA control circuit 9.

In the DMA control circuit 9, the received data are transferred to a predetermined data buffer of the main memory 3 on the basis of values of the per-channel parameter registers 91-98, thus completing the receiving process.

On the other hand, when transmitting the frames, the CPU 10 receives a frame transmitting start command from the host processor 4. If a frame is transmittable as indicated by a status at that channel by referring to the memory module 11 and various registers, the CPU 10 issues the transmitting process start command to the DMA control circuit and the line control circuit 8 as well. The CPU 10 resets the frame transmittable status after transmission.

The DMA control circuit 9 reads the data which form the information fields of the frame to be transmitted from the transmitting data buffer of the main memory 3 with reference to the per-channel parameter registers 91-98. Such data are transferred via the transmitting data bus 14 to the line control circuit 8.

In the line control circuit 8, the status register of the channel number concerned is updated in accordance with the transmitted data. At the same moment, the address, control field and frame check sequence are added for fabricating the frame. The frames are sent via the channel selector 7 to the line correspondence units 61-68 of the channel numbers designated from the CPU 10.

In the line correspondence units 61-68, the received frames are then transmitted to the transmitting line TL in accordance with line clocks, thus completing a series of transmitting processes.

According to this embodiment, it is possible to obtain the multichannel communication processing system for executing the communication processes of a plurality of channels, this system including a mere set of the CPU, the line control means A, the DMA control means B. The memory module and the line correspondence means C having the line correspondence units the number of which corresponds to the number of channels. As a result, the system can be miniaturized on the whole. The costs can remarkably be reduced.

The number of lines which corresponds to the maximum processing capability of the built-in CPU is freely set. The processing capability can be optimized, thereby making it possible to enhance a system efficiency.

Figure 3:
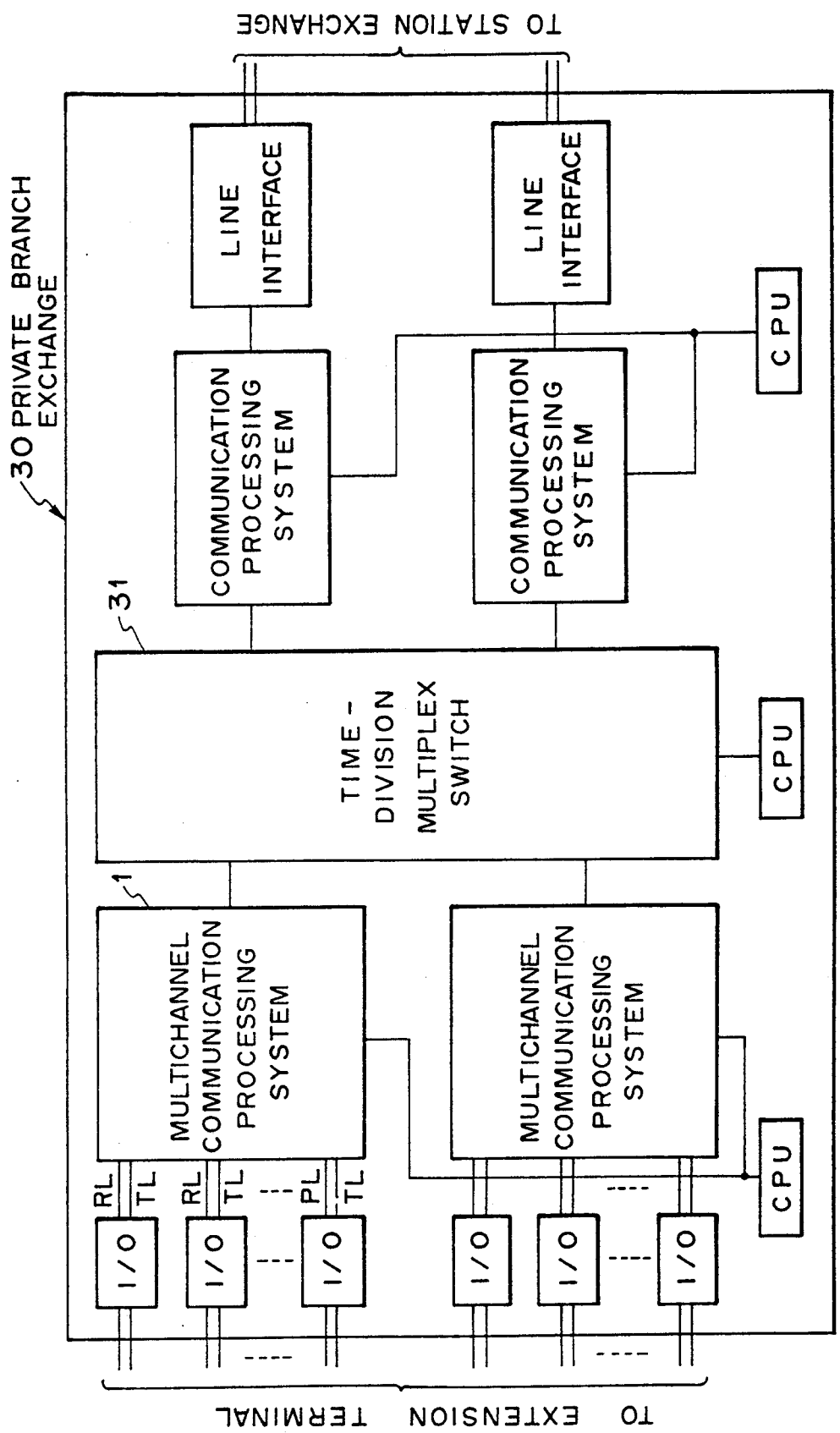
FIG. 3 is a block diagram showing a configuration of one embodiment of an exchange equipped with the multichannel communication processing system of this invention.

FIG. 3 is a block diagram depicting a configuration of one embodiment of an exchange equipped with the multichannel communication processing system of this invention.

A private branch exchange 30 is separated into a unit on the side of a station exchange and a unit on the side of an extension terminal, with a time-division multiplex switch 31 serving as its center. The multichannel communication processing system 1 is employed for the extension terminal. One multichannel communication system 1 works to process the data of a plurality of, e.g., eight extension lines. Therefore, the entire system of the private branch exchange 30 can be miniaturized, and its manufacturing costs can remarkably be reduced.

In accordance with the embodiment shown in FIG. 1, the respective transmitting/receiving lines are independent per channel. Physically, however, a plurality of channels can be time-division-multiplexed by a single transmitting/receiving line.

Figure 4:
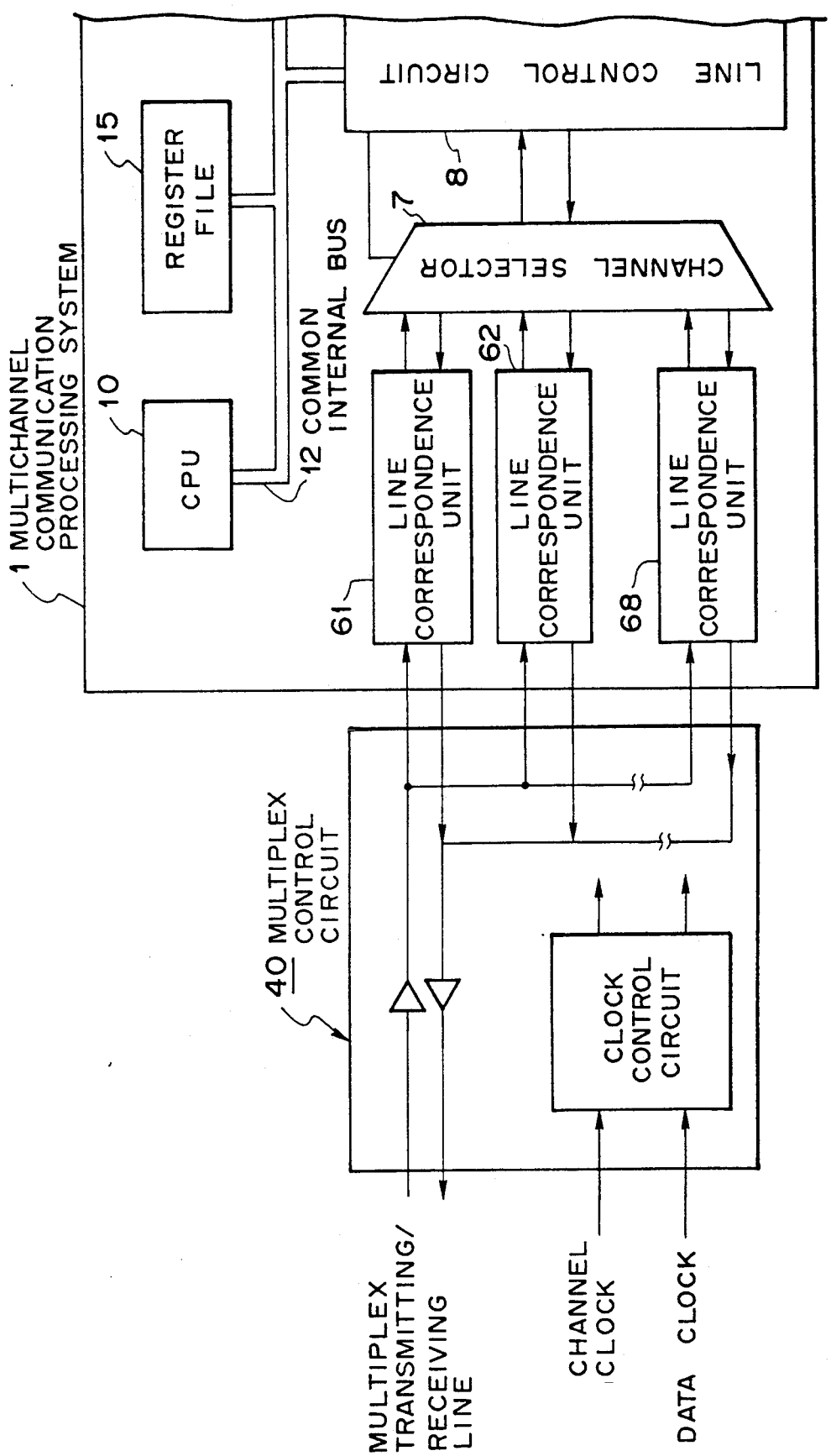
FIG. 4 is a block diagram depicting a configuration of one embodiment of the multichannel communication processing system of this invention, wherein a plurality of channels are time-division-multiplexed by one transmitting/receiving line.
Figure 5:
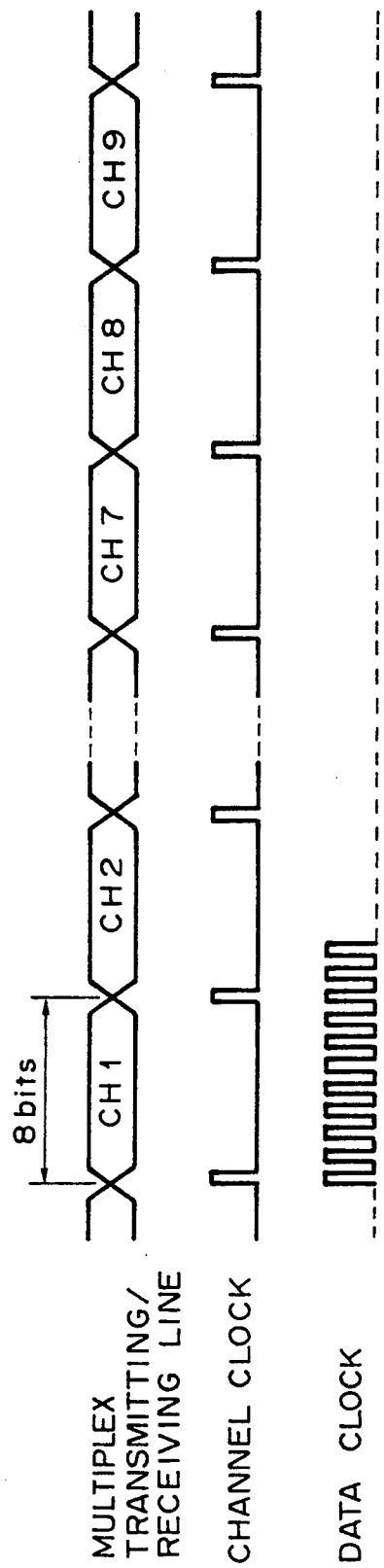
FIG. 5 is a time chart showing signals on the transmitting/receiving line and clock waveforms.

FIG. 4 is a block diagram showing a configuration of one embodiment of the multichannel communication processing system of this invention, wherein the plurality of channels are time-division-multiplexed by the single transmitting/receiving line. FIG. 5 is a time chart showing signals on the transmitting/receiving line and clock waveforms.

In a multiplex transmitting/receiving line, 8-bit data of a channel 1, a channel 2 and a channel 3, . . . are time-division-multiplexed. Supplied from outside are a channel clock indicating a channel section and a data clock indicating a bitwise data section.

A multiplex control circuit 40 multiplexes or separates the data multiplexed on the basis of the channel clock and the data clock. More specifically, the multiplexed and received data are separated and supplied to the line correspondence unit 61. Reversely, the data given from the line correspondence unit 61 are multiplexed en bloc and sent to the multiplex transmitting-/receiving line.

Where the multiplex control circuit 40 is to be large-scale-integrated, the integration on one chip may be effected together with the multichannel communication processing system 1.

Figure 6:
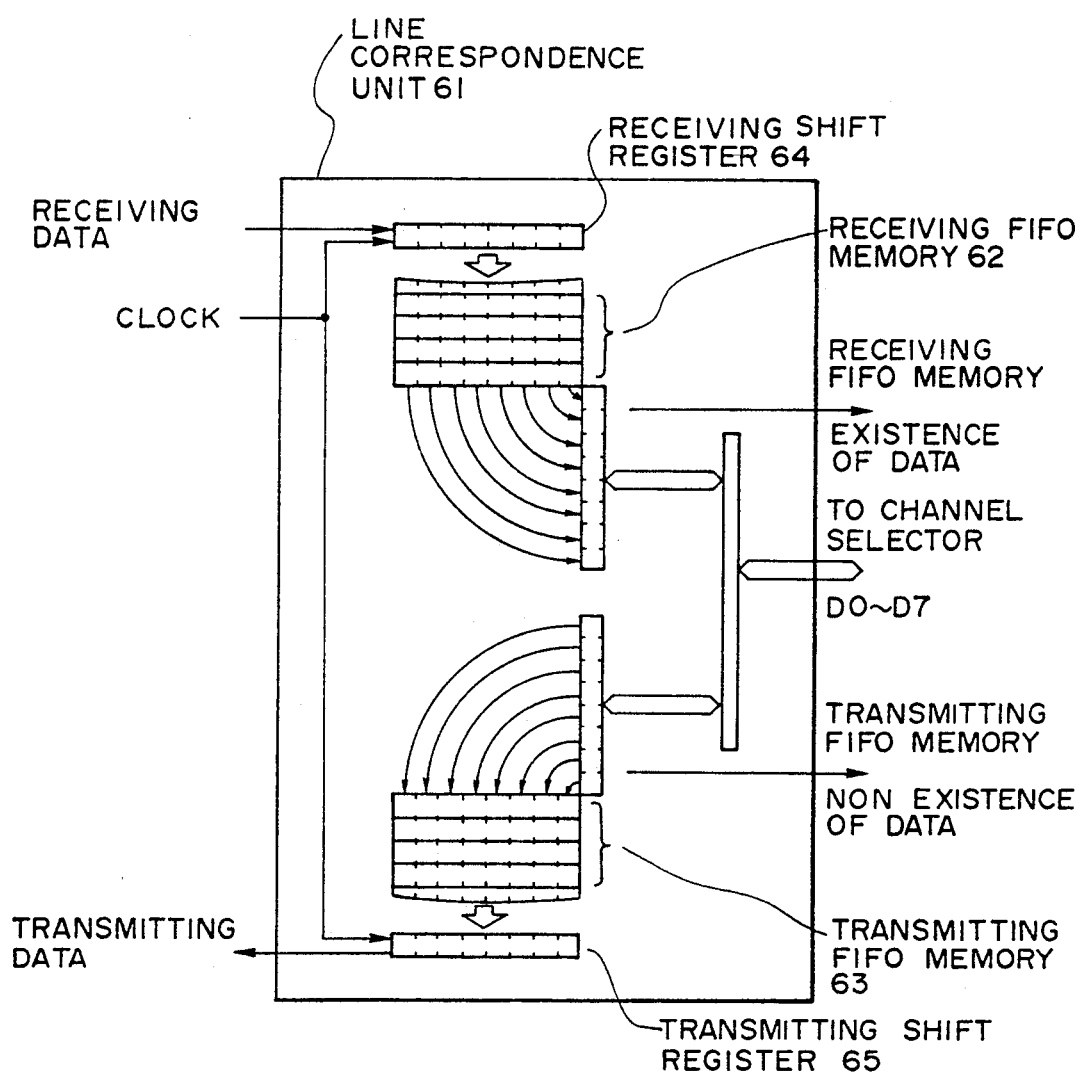
FIG. 6 is a block diagram fully illustrating a configuration of one embodiment of a line correspondence unit.

FIG. 6 is a block diagram illustrating a detailed configuration of one embodiment of the line correspondence unit.

The line correspondence unit 61 includes: a 8-bit receiving shift register 64 for converting serial receiving data into parallel receiving data; a receiving FIFO memory 62 for temporarily accumulating the data; a transmitting FIFO memory 63 for temporarily accumulating the transmitting data; and a transmitting shift register 65 for converting the parallel transmitting data into the serial transmitting data.

The operation of the line correspondence unit 61 will next be described. At the receiving time, the serial data received at a rate of, e.g., 16 kbps are converted 8-bitwise into parallel data by the receiving shift register 64. The parallel data are then stored in a receiving FIFO memory 62. The line correspondence unit 61 transmits a signal indicating, for example, [existence of receiving FIFO memory data]to the line control circuit 8. The same unit 61 then waits for processing by the line control circuit 8. The line control circuit 8 sequentially reads the data of the receiving FIFO memory 62 at timings when processing the receiving data of the line correspondence unit of that channel. The circuit 8 then executes the necessary process.

The line correspondence unit 61 transmits, if the transmitting FIFO memory is unoccupied, a signal indicating, e.g., [non-existence of transmitting FIFO memory data] to the line control circuit 8 at the transmitting time. The line control circuit 8, which has received this signal, writes the data to the transmitting FIFO memory 63 when a necessity for transmission arises. The transmitting shift register 65 converts the received parallel data into serial data and transmits the data at a rate of, e.g., 16 kbps.

FIG. 6 shows an example of providing the 5-stage 8-bit receiving FIFO memories 62 and the 6-stage 8-bit transmitting FIFO memories 63. Considerations will herein be given to the number of stages of the FIFO memories required. It is assumed that the number of channels is set to 8, and a load at which receiving of all the channels is simultaneously effected is set at the maximum level.

A system clock of the CPU 10 is 6 MHz, and one instruction is executed at 4 clocks. Processing of a set of transmitting/receiving frames takes 500 steps. In this case a processing time needed is given by: $(4\times 500)/(6\times 10^6)=3.3\times 10^{-4}$ sec. In the case of 8 channels, the processing time is given by: $3.3\times 10^{-4}\times 8=2.64\times 10^{-3}$ sec.

When the data receiving rate is 16 kbps, the number of bits received during a period of $2.64\times 10^{-3}$ sec is expressed such as: $2.64\times 10^{-3}/(1/(16\times 10^3))=42.24$ bits=approximately 6 bytes.

Hence, six stages of the receiving FIFO memories 62 suffice. In general, the transmitting process is executable with a fewer number of steps than in the receiving process. Therefore, the number of transmitting FIFO memories 63 may be smaller than that of the receiving FIFO memories 62.

According to the present invention, it is feasible to obtain the multichannel communication processing system consisting of a mere set of the CPU, the line control means, the DMA control means, the memory module and the line correspondence means including the line correspondence units the number of which corresponds to the number of channels, whereby communication processing of the plurality of channels can be executed. Therefore, the entire system can be miniaturized, and the costs are considerably reduced.

The number of lines which corresponds to the maximum processing capability of the built-in CPU is freely set, and the processing capability can be optimized. As a result, the system efficiency can be enhanced.

We claim:

1. A multichannel communication processing system, in a communications exchange for simultaneously executing communications on a plurality of lines, comprising:

a line control means for analyzing receiving frames simultaneously received through a plurality of lines and channel-controlling transmitting frames simultaneously transmitted through said lines;

a DMA control means for transferring frames not via a host processor but directly to a main memory;

a memory for storing a variety of data and a communication protocol processing program;

a CPU for controlling said communication processing system as whole to effect simultaneous communication processing by use of said data and said communication protocol processing program stored in said memory; and a line correspondence means including line correspondence units corresponding to said plurality of lines, each line correspondence unit being disposed between a corresponding line and said line control means, each line correspondence unit effects serial interface between a channel of a corresponding line and said line control means.

2. The multichannel communication processing system as set forth in claim 1, wherein each of said line correspondence units includes a data buffer for temporarily storing data, said line control means includes a channel selector for selecting one of said line correspondence units and a register for holding statuses per channel, and said DMA control means includes a register for holding parameters per channel.

3. The multichannel communication processing systems as set forth in claim 1 or 2, wherein data transferred between said CPU, said line control means, said DMA control means and said memory contain channel information.

4. An ISDN communication protocol LSI including said multichannel communication processing system as set forth in claim 1.

5. An exchange equipped with said multichannel communication processing system as set forth in claim 1.

6. a multichannel communication processing system, a communications exchange for simultaneously executing communications on a plurality of lines, comprising:

line control means for analyzing receiving frames simultaneously received through a plurality of lines and channel-controlling transmitting frames simultaneously transmitted through said lines;

a DMA control means for transferring frames not via a host processor but directly to a main memory;

a memory for storing a variety of data and a communication protocol processing program;

a CPU for controlling said communication processing system as whole to effect simultaneous communication processing by use of said data and said communication protocol processing program stored in said memory;

a line correspondence means including a plurality of line correspondence units corresponding to said plurality of lines, each line correspondence unit being disposed between a corresponding line and said line control means, each line correspondence unit effects serial interface between a respective channel of a corresponding line and said line control means; and a multiplex control circuit, disposed between said line correspondence means and multiplex transmitting/receiving lines, for separating multiplexed data transmitted from said multiplex transmitting line, simultaneously supplying the data to said line correspondence units, multiplexing en bloc the data from said line correspondence units and simultaneously sending the data to said multiplex transmitting/receiving lines.

7. The multichannel communication processing system as set forth in claim 6, wherein each of said line correspondence units includes a data buffer for temporarily storing the data, said line control means includes a channel selector for selecting each of said line correspondence units and a register for holding statuses per channel, and said DMA control means includes a register for holding parameters per channel.

8. The multichannel communication processing system a set forth in claim 6 or 7, wherein the data transferred between said CPU, said line control means, said DMA control means and said memory contain channel information.

9. An ISDN communication protocol LSI including said multichannel communication processing system as set forth in claim 6.

10. An exchange equipped with said multichannel communication processing system as set forth in claim 6.

11. The multichannel communication processing system as set forth in claim 1, wherein a data bus dedicated to receiving and a data bus dedicated to transmitting are provided between said line control means and said DMA control means.

12. The multichannel communication processing system as set forth in claim 11, wherein said multichannel communication processing system is constructed of one or a plurality of semiconductor chips.

13. An ISDN communication protocol LSI including said multichannel communication processing system as set forth in claim 12.

14. An exchange equipped with said multichannel communication processing system as set forth in claim 13.

15. The multichannel communication processing system as set forth in claim 2, wherein a data bus dedicated to receiving and a data bus dedicated to transmitting are provided between said line control means and said DMA control means.

16. The multichannel communication processing system as set forth in claim 1, wherein said multichannel communication processing system is constructed of one or a plurality of semiconductor chips.

17. An ISDN communication protocol LSI including said multichannel communication processing system as set forth in claim 16.

18. An exchange equipped with said multichannel communication processing system as set forth in claim 17.

19. The multichannel communication processing system as set forth in claim 3, wherein a data bus dedicated to receiving and a data bus dedicated to transmitting are provided between said line control means and said DMA control means.

20. The multichannel communication processing system as set forth in claim 2, wherein said multichannel communication processing system is constructed of one or a plurality of semiconductor chips.

21. An ISDN communication protocol LSI including said multichannel communication processing system as set forth in claim 1.

22. An exchange equipped with said multichannel communication processing system as set forth in claim 21.

23. The multichannel communication processing system as set forth in claim 3, wherein said multichannel communication processing system is constructed of one or a plurality of semiconductor chips.

24. An ISDN communication protocol LSI including said multichannel communication processing system as set forth in claim 2.

25. An exchange equipped with said multichannel communication processing system as set forth in claim 1.

26. An ISDN communication protocol LSI including said multichannel communication processing system as set forth in claim 3.

27. An exchange equipped with said multichannel communication processing system as set forth in claim 2.

28. An exchange equipped with said multichannel communication processing system as set forth in claim 3.

29. The multichannel communication processing system as set forth in claim 6, wherein a data bus dedicated to receiving and a data bus dedicated to transmitting are provided between said line control means and said DMA control means.

30. The multichannel communication processing system as set forth in claim 29, wherein said multichannel communication processing system is constructed of one or a plurality of semiconductor chips.

31. An ISDN communication protocol LSI including said multichannel communication processing system as set forth in claim 30.

32. An exchange equipped with said multichannel communication processing system as set forth in claim 31.

33. The multichannel communication processing system as set forth in claim 7, wherein a data bus dedicated to receiving and a data bus dedicated to transmitting are provided between said line control means and said DMA control means.

34. The multichannel communication processing system as set forth in claim 6, wherein said multichannel communication processing system is constructed of one or a plurality of semiconductor chips.

35. An ISDN communication protocol LSI including said multichannel communication processing system as set forth in claim 34.

36. An exchange equipped with said multichannel communicating processing system as set forth in claim 35.

37. The multichannel communication processing system as set forth in claim 8, wherein a data bus dedicated to receiving and a data bus dedicated to transmitting are provided between said line control means and said DMA control means.

38. The multichannel communication processing system as set forth in claim 7, wherein said multichannel communication processing system is constructed of one or a plurality of semiconductor chips.

39. An ISDN communication protocol LSI including said multichannel communication processing system as set forth in claim 6.

40. An exchange equipped with said multichannel communication processing system as set forth in claim 39.

41. The multichannel communication processing system as set forth in claim 8, wherein said multichannel communication processing system is constructed of one or a plurality of semiconductor chips.

42. An ISDN communication protocol LSI including said multichannel communication processing system as set forth in claim 7.

43. An exchange equipped with said multichannel communication processing system as set forth in claim 6.

44. An ISDN communication protocol LSI including said multichannel communication processing system as set forth in claim 8.

45. An exchange equipped with said multichannel communication processing system as set forth in claim 7.

46. An exchange equipped with said multichannel communication processing system as set forth in claim 8.

* * * * *